(12) United States Patent
Chansler

(10) Patent No.: US 7,340,716 B1
(45) Date of Patent: Mar. 4, 2008

(54) USER INTERFACE SUBSTITUTION

(75) Inventor: Robert J. Chansler, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/467,310

(22) Filed: Dec. 17, 1999

(51) Int. Cl.
*G06F 9/44* (2006.01)
*G06F 3/00* (2006.01)
*G06F 3/048* (2006.01)

(52) U.S. Cl. ............... 717/106; 717/109; 717/110; 717/111; 717/113; 715/762; 715/763

(58) Field of Classification Search ......... 345/762, 345/763, 967, 700; 717/125, 126, 127, 106–113; 715/762, 763
See application file for complete search history.

(56) References Cited

U.S. PATENT DOCUMENTS

| | | | |
|---|---|---|---|
| 5,552,806 A * | 9/1996 | Lenchik ............... | 345/156 |
| 5,600,780 A * | 2/1997 | Hiraga et al. ........ | 345/762 |
| 5,838,315 A | 11/1998 | Craycroft et al. | |
| 5,907,326 A * | 5/1999 | Atkin et al. ......... | 715/866 |
| 6,100,885 A * | 8/2000 | Donnelly et al. ..... | 345/762 |
| 6,275,225 B1 * | 8/2001 | Rangarajan et al. .. | 345/700 |
| 6,342,907 B1 * | 1/2002 | Petty et al. .......... | 345/762 |

OTHER PUBLICATIONS

Sanna et al. "Using Windows NT Workstation 4.0", 1997, Que Corporation, Second Edition, p. 442-444.*
Microsoft Windows 2000, "Internet Information Services Features" at URL=http://www.microsoft.com/windows2000/server/evaluation/features/web.asp, Apr. 19, 1999.
AppleCare Knowledge Base Archive, "Mac OS 8: Appearance Information" at URL=http://docs.info.apple.com/article.html=artnum=24453, May 24, 1999.
Class java.util.ResourceBundle, public abstract class ResourceBundle extends Object at url=mk:@MSITStore:C:/Program%20Files/Microsoft%20Visual%.../java.util.ResourceBundle.htm, document viewed on Nov. 8, 1999.

* cited by examiner

*Primary Examiner*—Wei Zhen
*Assistant Examiner*—Qamrun Nahar
(74) *Attorney, Agent, or Firm*—Fish & Richardson P.C.

(57) ABSTRACT

Methods and apparatus define a user interface for a computer program after execution of the computer program has begun. A user interface for the program is defined by: associating a map component and a fashion component on the fly at run time to generate the user interface; and executing the user interface with the associated function and appearance.

34 Claims, 9 Drawing Sheets

USER INTERFACE SUBSTITUTION

BACKGROUND

The invention relates to systems and methods of defining a user interface for computer program.

Traditionally, graphical user interfaces have been employed to facilitate interaction of a user with software in a computer system. For example, typical objects in a GUI are icons presented on a background or "desktop", with the icons representing a set of functions, application programs, system resources, or the like. These icons may be selected to instruct the computer to perform particular functions.

GUI objects are generally created as part of a static application program construct that describes how a particular GUI object appears and what function is performed when that GUI is selected. Many visually-based application builder tools, such as Visual Basic, available from Microsoft Corporation of Redmond, Wash., have a graphical user interface that includes a "toolbox", a "form window", and a "property sheet," among others. A toolbox typically contains icons that represent different classes of components, or software modules. During a UI (user interface) construction session, a form window is displayed for the user to compose an application UI. A component selected from the toolbox may be "dropped", or otherwise placed, within the form window. Placing a component means placing an icon or other visual representation of the component, within the form window. A property sheet displays properties, or attributes, which relate to the selected component. The properties can include, but are not limited to, information relating to the size, color, and name of the selected component. Programmers then insert code for each object to handle events generated by a user during operation.

After an application has been developed, a user generally has a limited ability to customize the user interface by modifying properties associated with certain GUI objects. In general, a property sheet displays a fixed set of properties that can be modified to customize, or configure, a given component. Hence, a user can select and modify different properties in the property sheet in order to customize a component. Simple components typically have fewer associated properties than larger components, and can therefore be readily customized by making selections in a property sheet.

As computer usage becomes increasingly widespread, the desire for custom computer applications that are specific to the needs of a particular user is also increasing. The desire is driven in part by the need to customize the software to the user's needs rather than force the user to adjust to the software, which can be tedious, time-consuming and non-productive.

SUMMARY OF THE INVENTION

In one aspect, a method defines a user interface for a computer program after execution of the computer program has begun by: reading a function description of a first function to be provided by the user interface; reading an appearance description of a first appearance to be presented by the user interface; associating the function description and the appearance description on the fly at run time; and executing the user interface with the associated function and appearance.

Implementations of the invention may include one or more of the following. The function description or the appearance description can be replaced during program execution. The method can include reading a map defining multiple functions to be provided by the user interface including the first function; reading a fashion defining all appearances to be presented by the user interface including the first appearance; associating the map and the function on the fly at run time; and executing the user interface with the associated map and function. The map or fashion can be replaced during program execution. The map can specify that a subordinate part of the user interface is specified by a second map-fashion pair. Events can be received from the map component or the fashion component. Business logic associated with the respective component can be executed. The components can be stored in a database.

In a second aspect, a method defines a user interface for a computer program by: associating a map component and a fashion component on the fly at run time to generate the user interface; and executing the user interface with the associated function and appearance.

Implementation of the method can include one or more of the following. A resource bundle associated with the map component can be loaded. Sub-components of the user interface can be loaded and instantiated. The fashion component can be called to allocate a resource to each sub-component. Each sub-component can be instructed to present itself in the user-interface. Events from the map component or the fashion component can be received.

Advantages of the invention include one or more of the following. The map (controller) and the fashion (view) need not be static and each can be changed (or can change itself) independently of the other during execution of a program. By changing the map, the logic of the user interface can change while the same fashion is used to provide continuity of presentation. By changing the fashion without changing the map, the logic of the user interface can be presented with radically different appearances. Further, to provide flexibility, the map can specify that a subordinate part of a user interface is to be constructed using a second map-fashion pair.

The logic and appearance of a user interface can be built independently, making the UI presentation more accessible to non-programmers. The UI can be modified without re-compiling the application. Because of late binding, the details of the UI presentation are established at execution time for the application. Hence, user interface development can be decoupled from code development. Hence, a visual designer can design a user interface without incurring delays associated with involving a programmer.

The UI specification is declarative rather than procedural. The declarative aspect is advantageous in that abstract, high-level specifications can be synthesized without a detailed procedural description of the required action, such as calling the system to allocate a particular resource, to get a layout object, to modify the layout object, and to attach the modified layout object to another layout object.

The appearances can be presented using a graphical interface, or can be presented in a non-visual modality such as a voice user interface that can be used in speech driven computers, including telephones and voice activated computers. Moreover, much of the UI is exposed in a way that facilitates localization. Thus, it is easy to create a user interface for an international product in which customers in different see different text, images, and other user interface elements. Use of the invention allows a corporation or other group to implement a corporate appearance for its user interface across multiple products.

DETAILED DESCRIPTION

Figure 1:
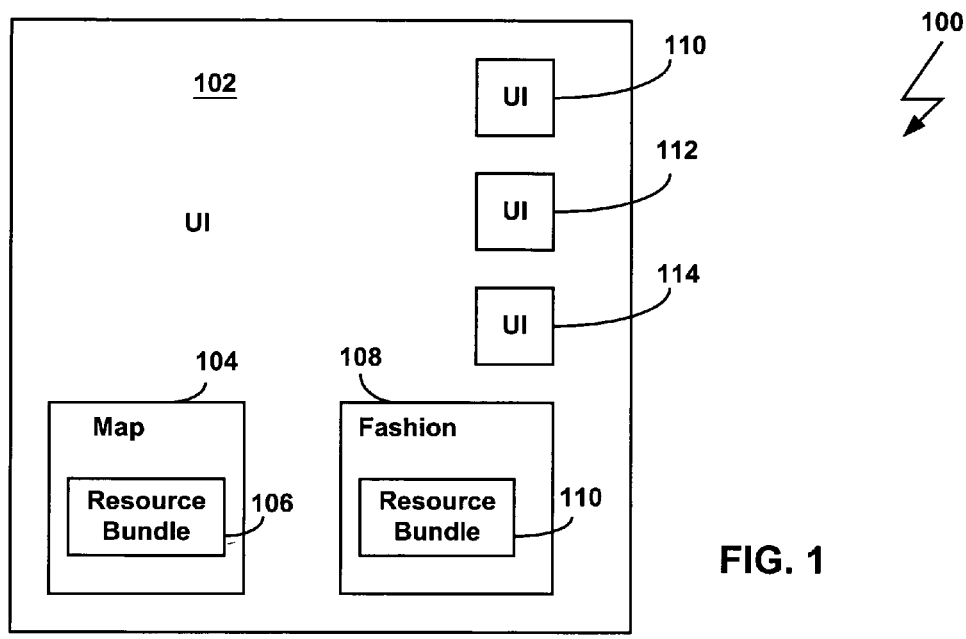
FIG. 1 is a diagram showing a system with an exemplary user interface object.

As shown in FIG. 1, a system 100 has a user interface (UI) object. The UI object 102 can have a graphical modality such as a two-dimensional or three-dimensional graphical user interface, or can have a different modality, such as a voice user interface commonly used in telephone response system.

The object 102 has a map component 104. The map component 104 contains instructions for handling and processing objects contained in the user interface. The map component 104 thus embodies logic associated with the user interface object 102. The map component 104 knows that certain UI resources are available to it and are defined in a resource bundle 106 with a list of UI objects and their characteristics. The resource bundle can be created by an application programmer or can be programmatically generated. The resource bundle contains, directly or by reference, the layout rule for each UI object and the requisite system call that displays and enable that UI object to generate an event based on a user input.

The UI objects in the resource bundle 106 can include, for example, a text-box that provides an area to enter or display text. The UI object can be a checkbox, which displays a True/False or Yes/No option. The UI objects can include combo-box that combines a text box with a list box and allows a user to type in a selection or select an item from a drop-down list. The UI objects can include a button that carries out a command or action when a user chooses it. Yet another exemplary UI object can be a horizontal scrollbar and vertical scrollbar, which allow a user to add scroll bars to controls that do not automatically provide them.

Resource bundles contain locale-specific objects. When the application software needs a locale-specific resource, a "String" for example, the program can load it from the resource bundle that is appropriate for the current user's locale. In this way, program code can be largely independent of the user's locale by isolating most, if not all, of the locale-specific information in resource bundles. Each related subclass of the resource bundle contains the same items, but the items have been translated for the locale represented by that resource bundle subclass. For example, both MyResources (English version) and MyResources_de (German version) may have a String that is used on a button for confirming operations. In MyResources the String may contain "OK" and in MyResources_de it may contain "Gut."

When the program needs a locale-specific object, it loads the resource bundle class using a "getBundle( )" method. The resource bundle lookup searches for classes with various suffixes on the basis of (1) the desired locale and (2) the default locale (baseclass); the search order is from lower-level (more specific) to parent-level (less specific). The result of the lookup is a class, but that class may be backed by a property file on disk. If a lookup fails, getBundle( ) throws a missing resource exception. Such an exception will generally cause the map component 104 to rely on a default locale.

The map component 104 contains logic to handle one or more events generated by the UI objects. An event has a life cycle that begins with the action or condition that initiates the event and ends with the final response by the event handler. Typically, a user action or condition associated with the event occurs, and an event object is updated to reflect the conditions of the event. The event fires to notify the logic in the map component 104. The map component logic executes an event handler associated with the event is called. The event handler carries out its actions and returns. The event is provided to the next element in the hierarchy, and the event handler for that element is called. For events that bubble, if there is no event handler bound to the source element generating the event, the event handler for the next element up the element's hierarchy is called.

The user interface object 102 also contains a fashion component 108. The fashion component 108 embodies the presentation, including the layout of the object 102. The fashion component is a collection whose elements represent each loaded form in an application. The fashion component 108 also derives its knowledge from a resource bundle 110. In one embodiment, the resource bundle 106 is the same as the resource bundle 110.

The user interface object 102 also can include additional user interfaces 110, 112 and 114. The UIs 110, 112, and 114 provide programmatical support for the user to navigate to another presentation. In one embodiment, the UI 110, 112 or 114 can be a button which, when clicked, moves users backwards or forwards in the application.

During initialization, the application associated with the user interface object 102 loads the map component 104 and the fashion component 108 before creating a presentation to the user. The map component 104 and the fashion component 108 need not be static. The map component 104 and the fashion component 108 can be replaced during execution. By changing the map component 104, the logic of the user interface can be altered while the same fashion component 108 can still be used to provide a continuity of presentation. Correspondingly, the fashion component 108 can be changed during execution to allow the logic of the user interface to be presented with a radically different appearance or even in some non-visual modality, such as the voice user interface.

A variety of data components can be identified with one or more map components and one or more fashion components. The map component as well as the fashion component can change under the control of their code or can be changed by other map and fashion components. Thus, the user interface object 102 of FIG. 1 allows for an arbitrary composition. Two parts of the application user interface can be built independently using different map components or fashion component pairs. Alternatively, one map component can specify that a subordinate part of the user interface be constructed by a second map component 104 and a second fashion component 108 pair as needed.

Figure 2:
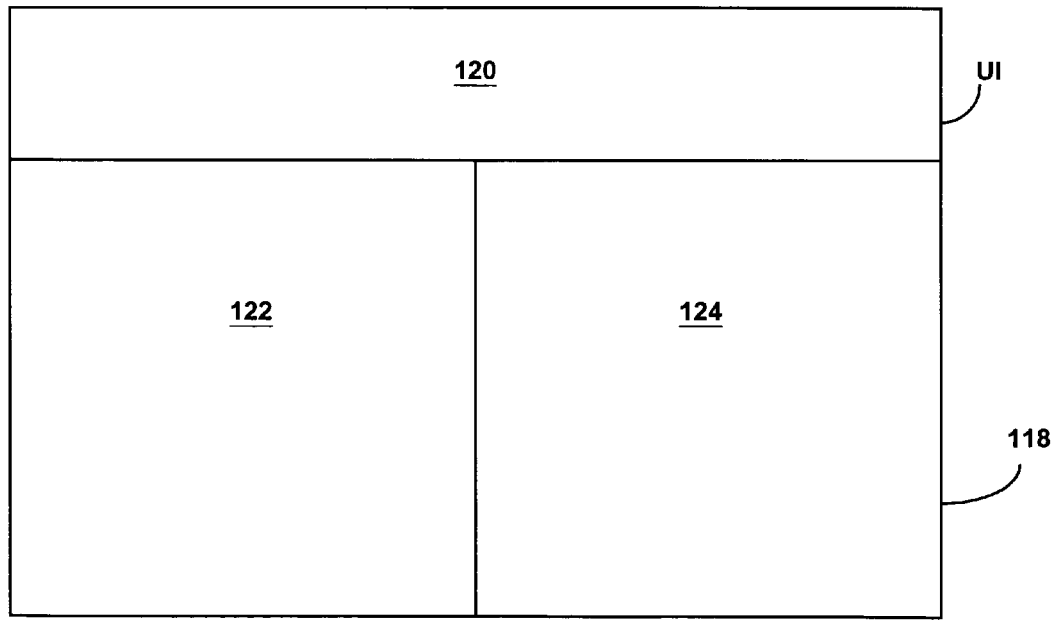
FIG. 2 is a diagram illustrating an exemplary user interface.

FIG. 2 illustrates an exemplary user interface. The user interface of FIG. 2 includes a top horizontal portion 120 that is positioned above a left lower portion 122 and right lower position 124. Further, each of the interface portions 120, 122 and 124 in turn can reference one or more secondary user interfaces.

Figure 3:
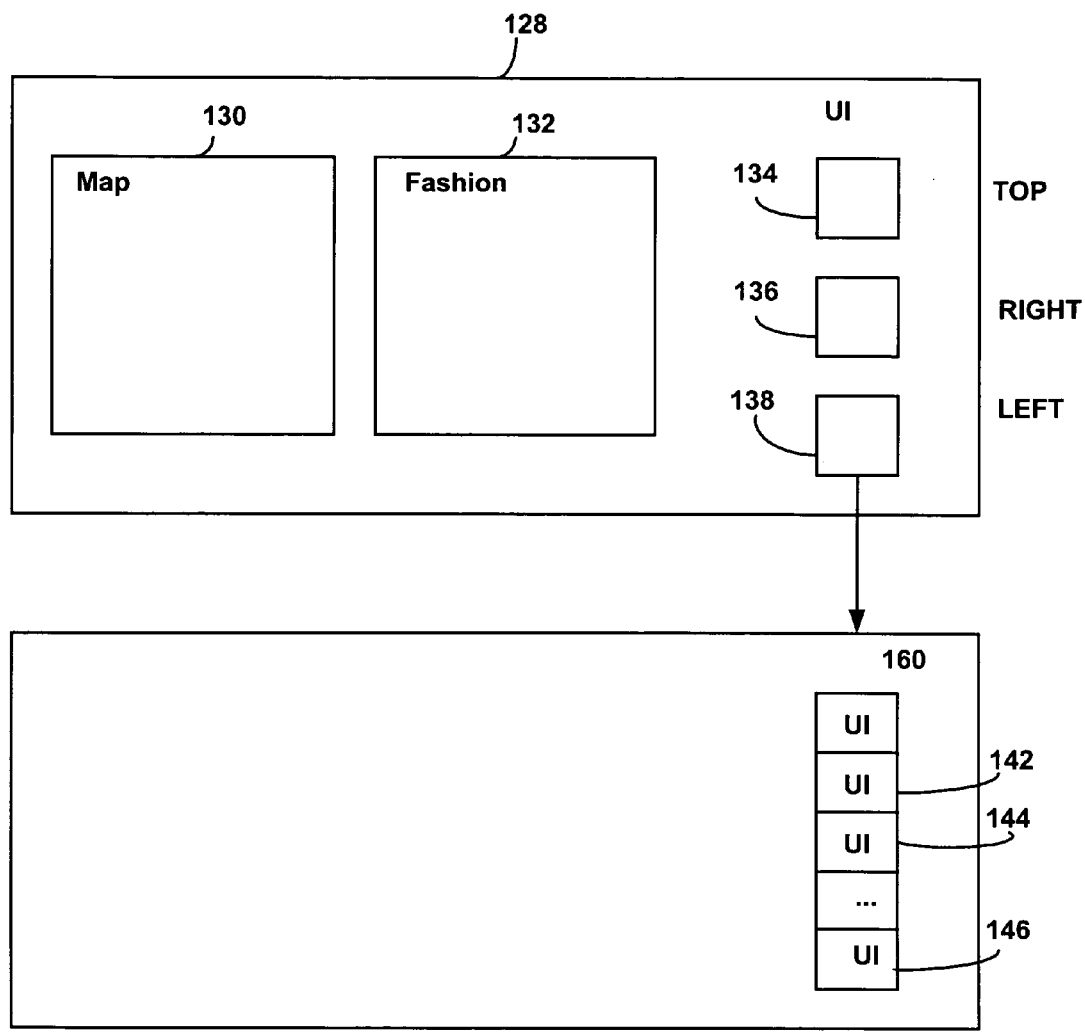
FIG. 3 is a diagram illustrating cascaded user interface objects.

FIG. 3 shows an exemplary structure associated with the user interface embodiment of FIG. 2. A user interface object 128 includes a map component 130 and a fashion component 132. The map component 130 and fashion component 132 each references one or more resource bundles that specify the UI objects such as buttons and text-boxes, for example. Moreover, the user interface 128 references a top user interface object 134, a right user interface object 136 and a left user interface object 138. During execution, the logic associated with the map component 130 finds the required subcomponents. In this case, the logic finds three objects 134, 136 and 138. The logic instantiates each object using the name of the map and the fashion. The user can navigate down the user interface hierarchy for subsequent display screens by selecting references to dependent user interface objects using various UI objects.

The exemplary structure of FIG. 3 also shows details associated with the left user interface object 138. Similar to the parent user interface object 128, the left user interface object 138 can designate a plurality of additional user interface objects 140, 142, 144, and 146. Although FIG. 3 only shows UI objects associated with the left user interface objects 138, it is to be understood that similar objects exist for the top and right user interface objects 134 and 136. Generally, the UI is developed through a process of recursive refinement until primitive UI components (a button or a text label, for instance) are specified. The resulting structure is a rooted, directed graph. Also, the same map or fashion may appear at different levels of the UI composition. More particularly, for two component UI objects (each of class UI) with map and fashion objects, the two maps (fashions) are different objects but may be the same class. For example, in the actual application, certain classes for simple navigation and for providing a particular look and feel for conventional UI widgets are used repeatedly.

Figure 4:
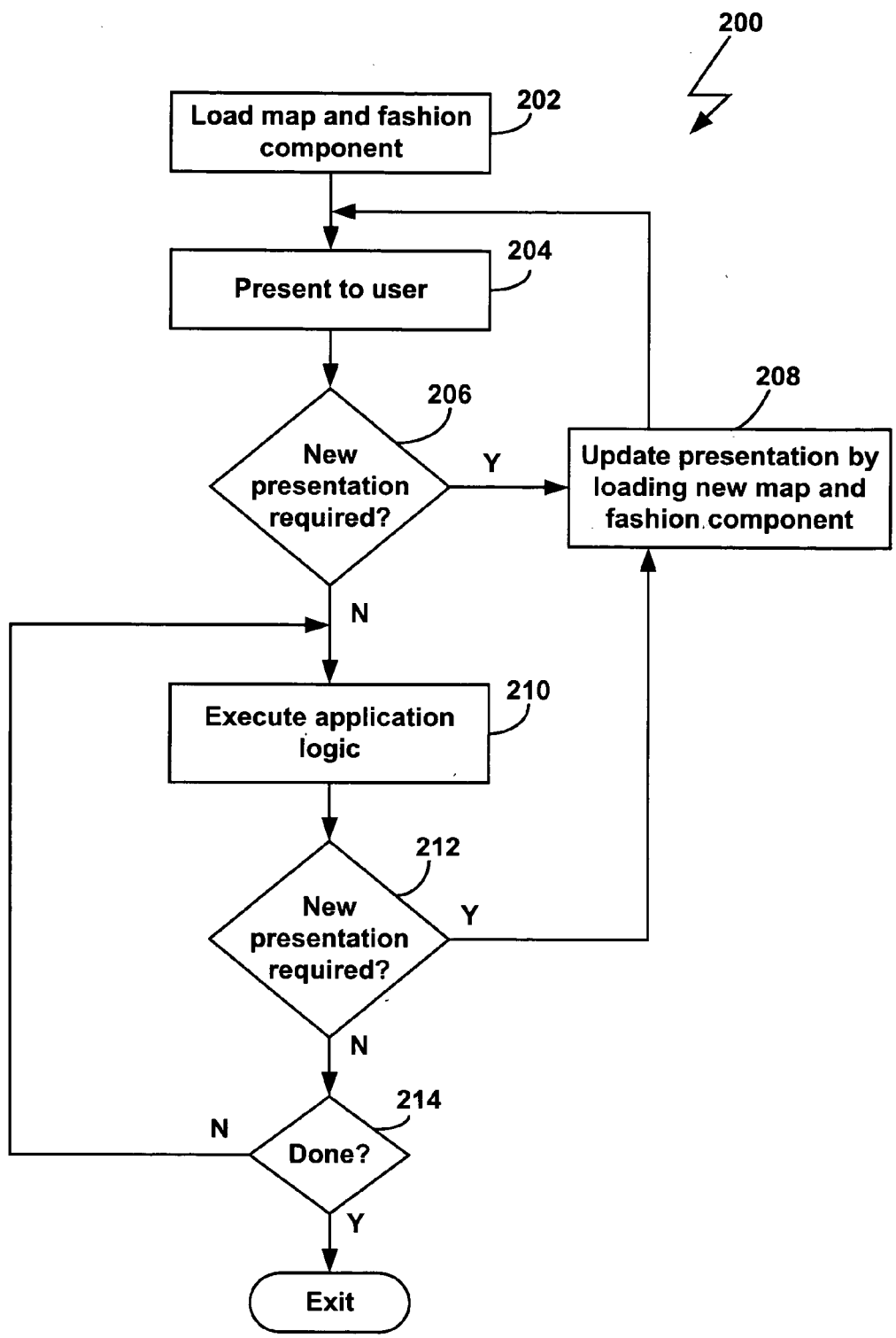
FIG. 4 is a flowchart illustrating a process for generating presentations based on the user interface objects.

Turning now to FIG. 4, a process associated with loading and using the user interface is shown. First, the map component and a fashion component are loaded (step 202). Next, a user interface is generated based on the map component and the fashion component loaded in step 202. A user interface or presentation is then presented to the user (step 204). Next, the application determines whether a new presentation is required (step 206). If so, the map and fashion components are updated (step 208) and the process 200 loops back to step 204 to present the user interface to the user. Alternatively, if a new presentation is not required, the process 200 executes the logic of the application (step 210).

After executing the business logic, the process 200 determines whether additional presentations are required (step 212). If so, the process 200 loops back to step 208 to reference new map and fashion components (step 208). Alternatively, if a new presentation is not required in step 212, the process 200 determines whether the user wishes to exit the application (step 214). If not, the process loops back to step 210 to continue executing the application. From step 214, if the user wishes to exit, the process 200 exits.

Figure 5:
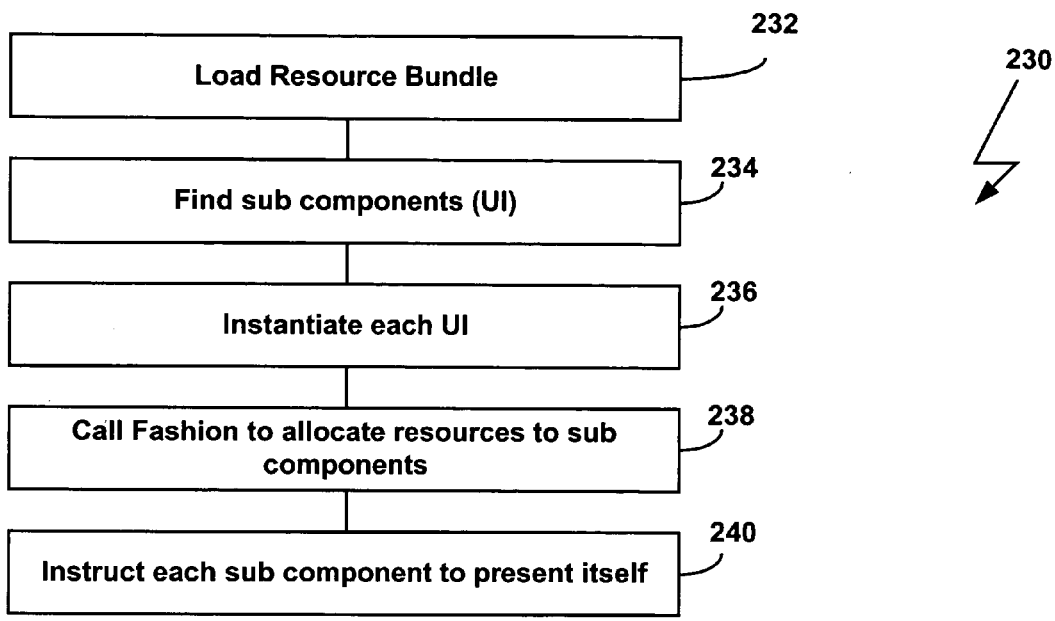
FIG. 5 is a flowchart illustrating the initialization of objects associated with a user interface.

FIG. 5 shows a process 230 for initializing a user interface. First, the process loads one or more resource bundles associated with the map component or with a fashion component. Next, each subcomponent of the user interface is located (step 234). The located subcomponents are then instantiated (step 236). Next, the process 230 calls the fashion component to allocate resources to the subcomponents (step 238). Finally, each component is then instructed to present itself on the screen as a user interface element or object (step 240).

Figure 6:
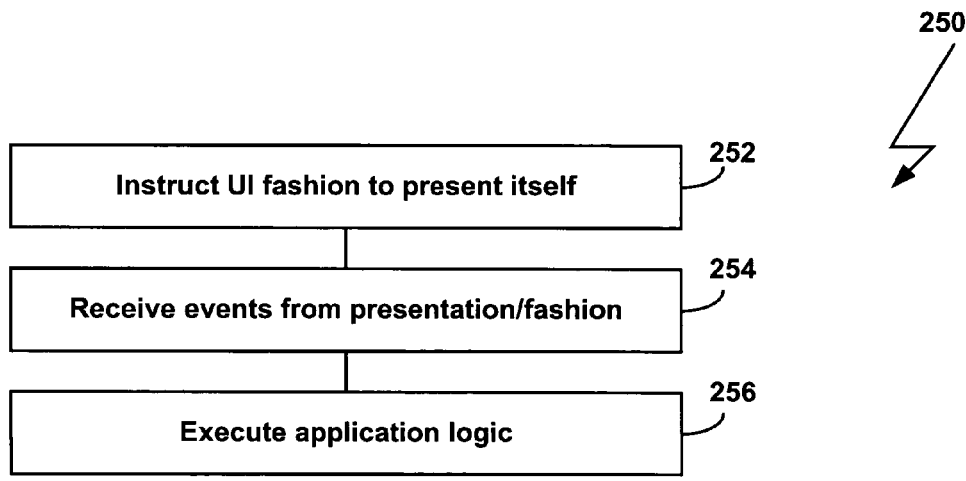
FIG. 6 is a flowchart illustrating the operation of the user interface initialized in FIG. 5.

FIG. 6 illustrates the operation of the map component 104. In the process 250, the map component 104 instructs the fashion component 108 to present itself (step 252). Next, the map component 104 listens for events generated during the presentation or by the fashion component 108 (step 254). The logic of the application is then executed (step 256).

Figure 7A:
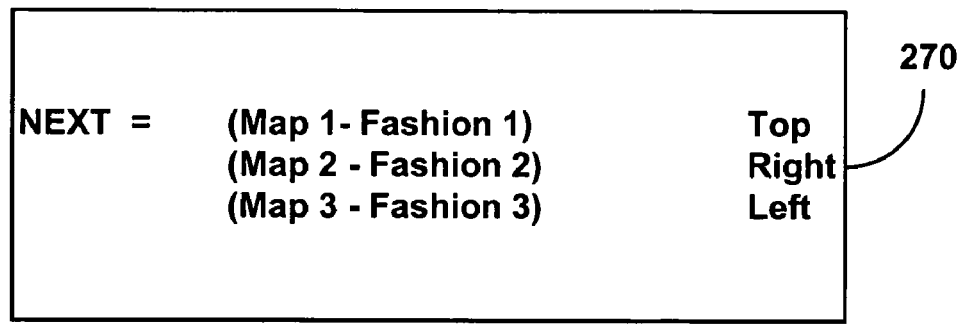
FIG. 7 is an exemplary representation of the specification of a user interface.

FIG. 7A shows pseudo-code associated with an exemplary user interface "next." The "next" user interface includes a plurality of maps: Map1-Map3. Map 1 is associated with fashion 1 which defines a user interface region called top. Map 2 is associated with a fashion component 2 and is associated with a right region. Finally, Map 3 is associated with fashion component 3 and is used to define a left region.

Figure 7B:
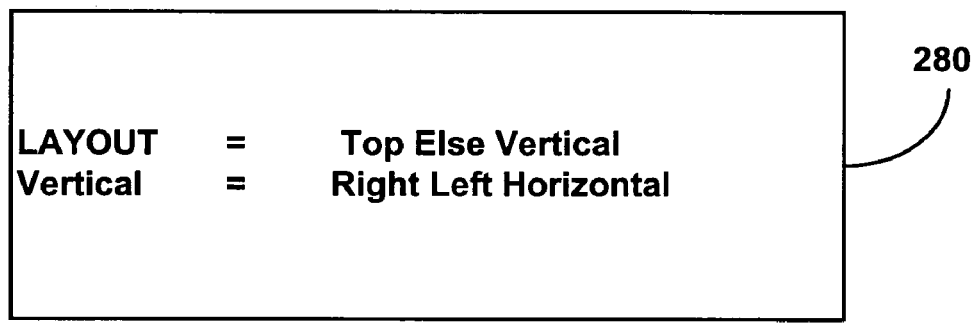

Pseudo-code associated with the user interface of FIG. 2 is shown in FIG. 7B. In this figure, the layout of the user interface is defined as having a top region such as the region 120 of FIG. 2 as a vertical region. The vertical region is further specified as having a right region such as the region 124 of FIG. 2 and a left region such as the region 122 of FIG. 2, both of which are laid horizontally adjacent each other under the top region.

Figure 8:
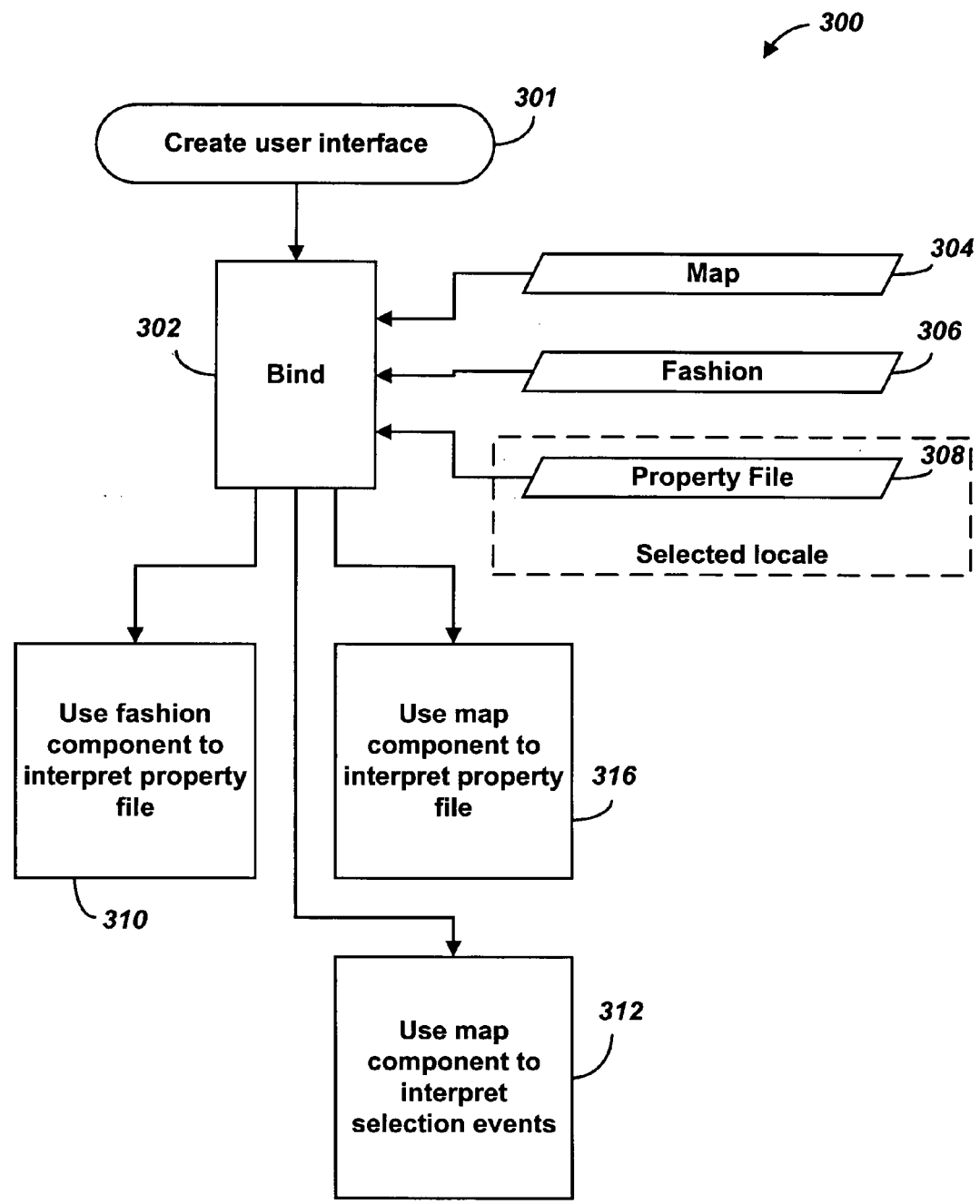
FIG. 8 is a diagram illustrating an embodiment of a process to generate a user interface presentation.

FIG. 8 is a diagram 300 illustrating the operation of one implementation embodying the map and fashion components. First, a user interface is created (step 301). The user interface includes a map component 304, a fashion component 306 and one or more properties files 308. Before the user interface is executed, a binding process 302 combines the map, fashion and property files into an executable ready form. During operation, the process 300 uses the fashion components to interpret the property files (step 310). Additionally, the nap components can be used to interpret various selection events generated by the user (step 312). Further, the map components can be used to interpret the property files (step 316).

During operation, the application can query a database, which can be resident with a host application or can be accessed remotely. In response, the database can provide information indicating the availability of different map components and fashion components. In one implementation, the identification of a server that will handle the query is provided in the query. Based on the response, an initial selection of the map component 104 and the fashion component 108 is made based on the query response. The selection can also be based on locale, which customizes the selection based on the geographic location of the user.

Based on the response to the query, an initial choice is made according to the environment variables and established preferences. A initial user interface is then presented to the user. The user can make certain selections using the UI defined in the map component or fashion component, and the presented interface can then be altered accordingly. Additionally, program logic embedded in the map component 104 can dictate the change of the map component 104 or the fashion component 108, respectively.

Figure 9:
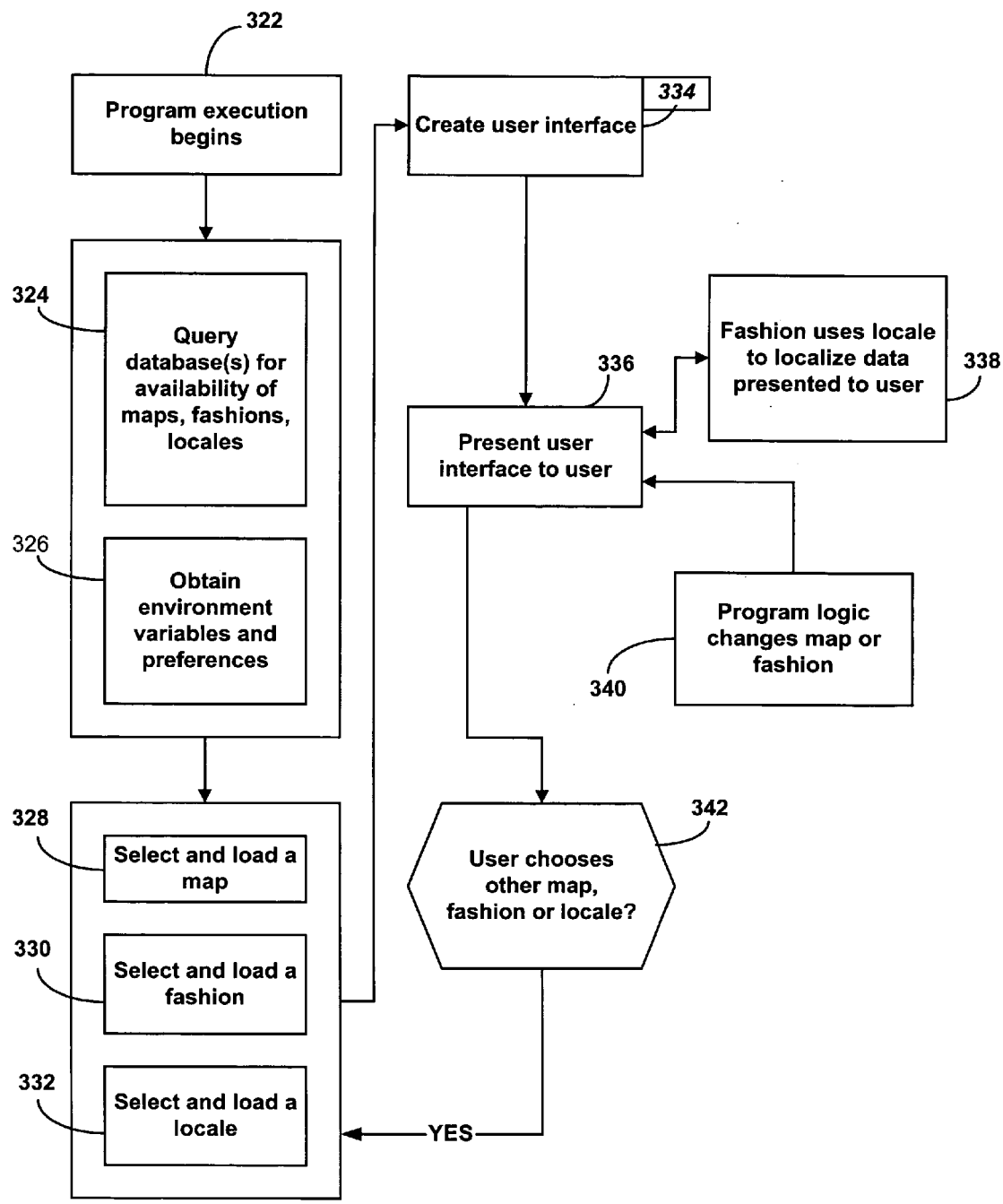
FIG. 9 is a flowchart illustrating a second process for generating presentations based on the user interface objects.

FIG. 9 shows a process 320 that is executed in one embodiment of the invention is shown. First, an application program is initiated (step 322). The execution of the program generates one or more queries directed at a database enquiring as to the availability of maps, fashions and locale (step 324). Next, a responsive database generates various environment variables and preferences, which are sent back to the application program (step 326). Next, the application program selects a map component (step 328). The application program then selects and loads a fashion component (step 330). Finally, a locale is selected and loaded (step 332). Next the user interface is created (step 324) and presented to the user (step 336). During this presentation, the fashion component uses the locale to localize data presented to the user (step 338). Further, the program and/or business logic information contained in the map component is used to either change the map component itself or the fashion component (step 340). From step 336, the user can choose another map, fashion or locale (step 342).

Figure 10:
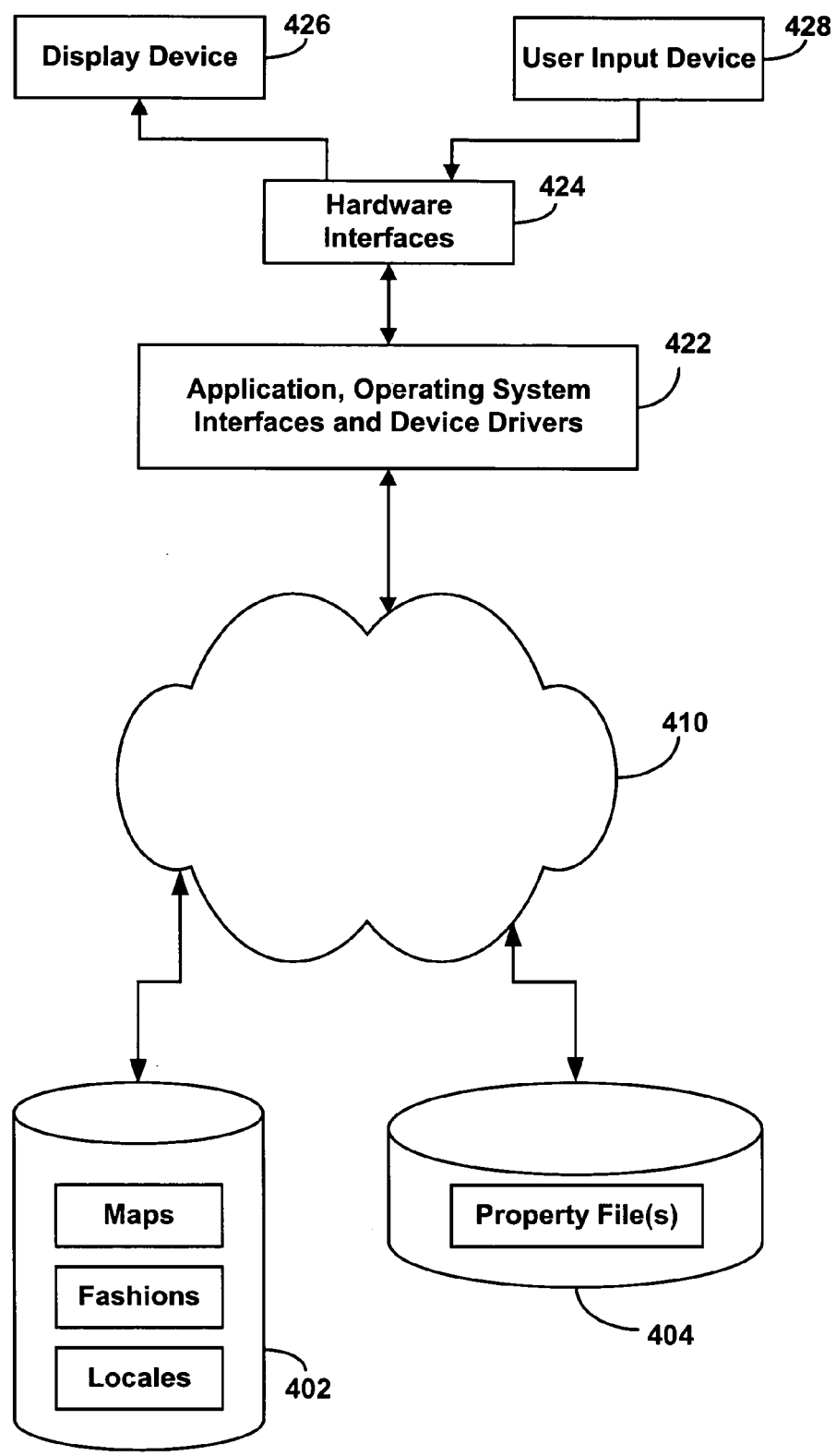
FIG. 10 is a diagram of an operating environment for the process of FIG. 4 or FIG. 9.

FIG. 10 shows apparatus associated with the process of FIG. 9. First, a remote database containing map components, fashion components and locale information is connected to a network 410. In addition to the map, fashion and locale information in the database 402, a property file can be contained in a second database 404 that is connected to the network 410.

On the other side of the network, the request is handled by application software, operating system interfaces and device drivers 422. The application, operating system interfaces and device drivers receive user instructions, as captured by an input/output hardware interface 424. The hardware 424 in turn drives a display device 426 and receives inputs from a user input device 428. Based on the map component, fashion component and locale information, an initial user interface is generated. The user interface can then be presented based on the user input as provided to the user input device 428. For each presentation, the map and the fashion can be changed independently of the other during execution of a program.

As shown above, the logic and appearance of a user interface can be built independently. Hence, an application visual designer can create the user interface without incurring delays associated with involving a programmer. Moreover, the UI specification is declarative rather than procedural. Thus, high-level specifications can be synthesized without a detailed procedural description of the required action. The appearances can be presented using a graphical interface, or can be presented in a non-visual modality such as a voice user interface that can be used in speech driven computers, including telephones and voice activated computers. Moreover, much of the UI is exposed in a way that facilitates localization by presenting localized text, images, and other user interface elements.

The techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

Figure 11:
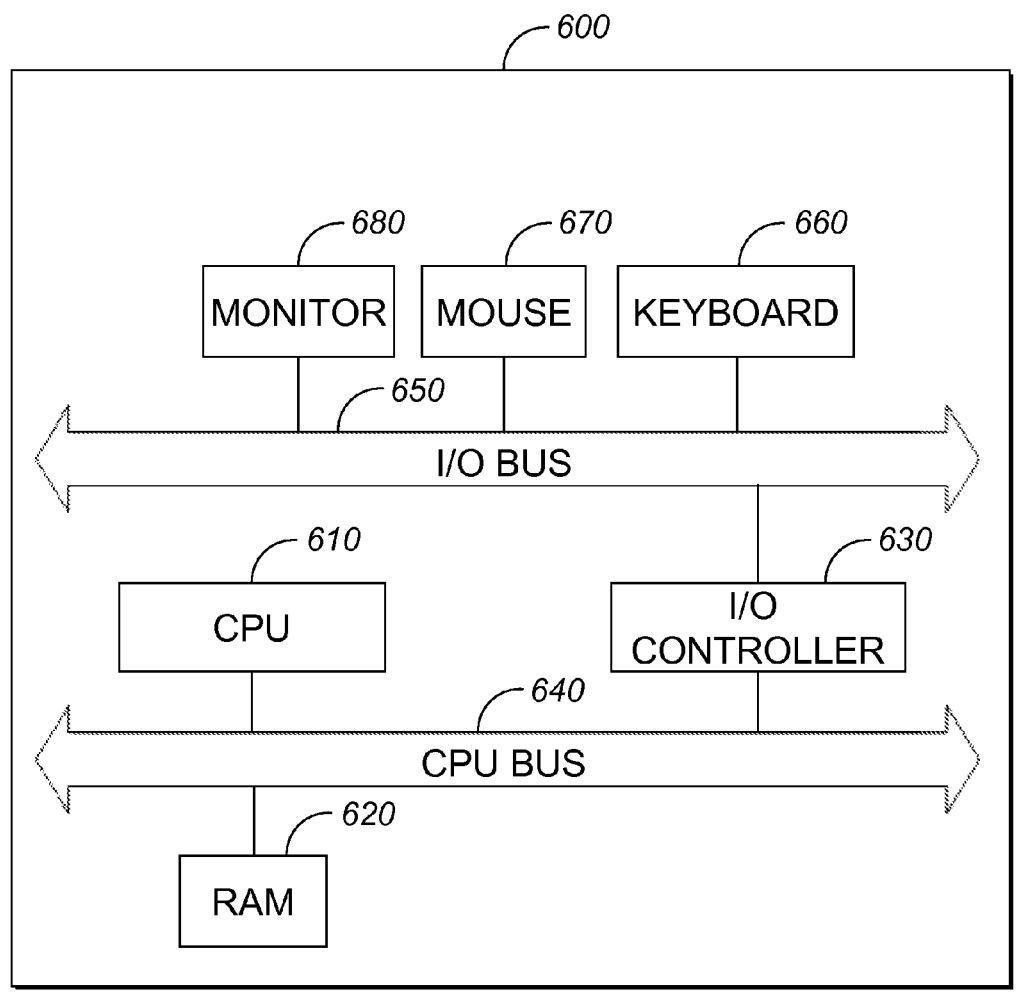
FIG. 11 is a diagram of an exemplary computer capable of executing the process of FIG. 4 or FIG. 9.

FIG. 11 illustrates one such computer system 600, including a CPU 610, a RAM 620, and an I/O controller 630 coupled by a CPU bus 640. The I/O controller 630 is also coupled by an I/O bus 650 to input devices such as a keyboard 660 and a-mouse 670, and output devices such as a monitor 680. Variations are within the scope of the following claims. For example, instead of using a mouse as the input devices, a pressure-sensitive pen or tablet may be used to generate the cursor position information.

Moreover, each program is preferably implemented in a high level procedural or object-oriented programming language to communicate with a computer system. However, the programs can be implemented in assembly or machine language, if desired. In any case, the language may be a compiled or interpreted language. Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner. While the invention has been shown and described with reference to an embodiment thereof, those skilled in the art will understand that the above and other changes in form and detail may be made without departing from the spirit and scope of the following claims.

What is claimed is:

1. A method of defining a user interface for a computer program, comprising:
    after execution of the computer program has begun, automatically defining the user interface of the computer program by:
    reading a function description of a first function to be provided by the user interface on the fly at run time, the function description comprising instructions to handle user interface events;
    executing logic on the fly at run time to select an appearance description of a first appearance to be presented by the user interface;
    associating the function description and the appearance description on the fly at run time into an executable form;
    executing the executable form of the user interface to generate the user interface with the associated function description and appearance description;
    executing logic to independently change one of the function description and the appearance description during program execution; and
    replacing the function description during program execution while providing a continuity of presentation or replacing the appearance description during program execution to present logic of the user interface with a different appearance.

2. The method of claim 1, further comprising:
    reading a map defining multiple functions to be provided by the user interface including the first function;
    reading a fashion defining all appearances to be presented by the user interface including the first appearance;
    associating the map and the fashion on the fly at run time; and
    executing the user interface with the associated map and fashion.

3. The method of claim 2, further comprising replacing the map during program execution.

4. The method of claim 2, further comprising replacing the fashion during program execution.

5. The method of claim 2, wherein the map specifies that a subordinate part of the user interface is specified by a second map-fashion pair.

6. The method of claim 2, further comprising receiving an event from one of the map and the fashion.

7. The method of claim 6, further comprising executing business logic associated with the received event.

8. The method of claim 1, further comprising customizing a selection base of function descriptions and appearance descriptions based on a geographic location of a user.

9. The method of claim 1, wherein a selection of at least one of the function description and the appearance description is made according to an environment variable.

10. The method of claim 1, further comprising selecting at least one of the function description and the appearance description based on a geographic location of a user of the computer program, wherein the function description is separate from the appearance description.

11. The method of claim 1, wherein the function description includes the logic to select an appearance description.

12. The method of claim 1, wherein the function description includes the logic to independently change one of the function description and the appearance description during program execution.

13. A computer-readable medium to define a user interface for a computer program, comprising instructions to:
    after execution of the computer program has begun, automatically define the user interface of the computer program by:
    read a function description of a first function to be provided by the user interface on the fly at run time, the function description comprising instructions to handle user interface events;
    execute on the fly at run time logic to select an appearance description of a first appearance to be presented by the user interface;
    associate the function description and the appearance description on the fly at run time into an executable form;
    execute the executable form of the user interface to generate the user interface with the associated function description and appearance description;
    execute logic to independently change one of the function description and the appearance description during program execution; and
    replace the function description during program execution while providing a continuity of presentation or replace the appearance description during program execution to present logic of the user interface with a different appearance.

14. The computer-readable medium of claim 13, further comprising instructions to:
    read a map defining multiple functions to be provided by the user interface including the first function;
    read a fashion defining all appearances to be presented by the user interface including the first appearance;
    associate the map and the fashion on the fly at run time; and
    execute the user interface with the associated map and fashion.

15. The computer-readable medium of claim 14, further comprising instructions to replace the map during program execution.

16. The computer-readable medium of claim 14, further comprising instructions to replace the fashion during program execution.

17. The computer-readable medium of claim 14, wherein the map specifies that a subordinate part of the user interface is specified by a second map-fashion pair.

18. The computer-readable medium of claim 14, further comprising instructions to receive an event from one of the map and the fashion.

19. The computer-readable medium of claim 18, further comprising instructions to execute business logic associated with the received event.

20. The computer-readable medium of claim 13, further comprising instructions to select at least one of the function description and the appearance description based on a geographic location of a user of the computer program, wherein the function description is separate from the appearance description.

21. The computer-readable medium of claim 13, wherein the function description includes the logic to select an appearance description.

22. The computer-readable medium of claim 13, wherein the function description includes the logic to independently change one of the function description and the appearance description during program execution.

23. A system to define a user interface for a computer program, comprising:
    a presentation device to present the user interface;
    a processor configured to perform operations comprising:
        after execution of the computer program has begun, automatically defining the user interface of the computer program by:
        reading a function description of a first function to be provided by the user interface on the fly at run time, wherein the function description comprises instructions to handle user interface events;
        executing on the fly at run time logic to select an appearance description of a first appearance to be presented by the user interface;
        associating the function description and the appearance description on the fly at run time into an executable form;
        executing the executable form of the user interface to generate the user interface with the associated function description and appearance description;
        executing logic to independently change one of the function description and the appearance description during program execution; and
    replacing the function description during program execution while providing a continuity of presentation or replacing the appearance description during program execution to present logic of the user interface with a different appearance.

24. The system of claim 23, wherein the processor is further configured to perform operations comprising:
    reading a map defining multiple functions to be provided by the user interface including the first function;
    reading a fashion defining all appearances to be presented by the user interface including the first appearance;
    associating the map and the fashion on the fly at run time; and
    executing the user interface with the associated map and fashion.

25. The system of claim 24, wherein the processor is further configured to perform operations comprising replacing the map during program execution.

26. The system of claim 24, wherein the processor is further configured to perform operations comprising replacing the fashion during program execution.

27. The system of claim 24, wherein the map specifies that a subordinate part of the user interface is specified by a second map-fashion pair.

28. The system of claim 24, wherein the processor is further configured to perform operations comprising receiving an event from one of the map and the fashion.

29. The system of claim 28, wherein the processor is further configured to perform operations comprising executing business logic associated with the received event.

30. The system of claim 23, wherein the processor is further configured to perform operations comprising selecting at least one of the function description and the appearance description based on a geographic location of a user of the computer program, the function description being separate from the appearance description.

31. The system of claim 23, wherein the function description includes the logic to select an appearance description.

32. The system of claim 23, wherein the function description includes the logic to independently change one of the function description and the appearance description during program execution.

33. The system of claim 23, wherein the presentation device comprises one or more of a display and a sound input-output device.

34. The system of claim 23, wherein the presentation device comprises a telephone.

* * * * *